(12) United States Patent
Tamura et al.

(10) Patent No.: US 7,210,786 B2
(45) Date of Patent: May 1, 2007

(54) PROJECTION DISPLAY DEVICE

(75) Inventors: Youichi Tamura, Minato-ku (JP); Takashi Nirasawa, Minato-ku (JP)

(73) Assignee: NEC Viewtechnology, Ltd., Tokyo (JP)

( * ) Notice: Subject to any disclaimer, the term of this patent is extended or adjusted under 35 U.S.C. 154(b) by 276 days.

(21) Appl. No.: 10/940,611

(22) Filed: Sep. 15, 2004

(65) Prior Publication Data

US 2005/0068500 A1   Mar. 31, 2005

(30) Foreign Application Priority Data

Sep. 26, 2003   (JP)   ............... 2003-335976

(51) Int. Cl.
  G03B 21/26   (2006.01)
  G03B 21/20   (2006.01)
  G03B 21/14   (2006.01)
  G03B 21/00   (2006.01)
  H04N 3/22    (2006.01)

(52) U.S. Cl. .................. 353/28; 353/30; 353/69; 353/85; 353/97; 353/122; 348/745

(58) Field of Classification Search .............. 353/28, 353/30, 69, 85, 97, 122; 348/744, 745; 712/224
See application file for complete search history.

(56) References Cited

U.S. PATENT DOCUMENTS

| 6,002,505 A | 12/1999 | Kraenert et al. ........... 359/196 |
| 6,361,173 B1 | 3/2002 | Vlahos et al. ................ 353/97 |
| 6,454,415 B1* | 9/2002 | Vlahos ........................ 353/30 |
| 6,554,431 B1* | 4/2003 | Binsted et al. ................ 353/28 |
| 2001/0005262 A1 | 6/2001 | Tsurushima .................. 353/121 |
| 2004/0160581 A1 | 8/2004 | Parker et al. ............... 353/122 |
| 2004/0165154 A1 | 8/2004 | Kobori et al. ................ 353/69 |

FOREIGN PATENT DOCUMENTS

| JP | H06-105191 A | 4/1994 |
| JP | 2000-194302 A | 7/2000 |
| JP | 2000-305481 A | 11/2000 |
| JP | 2003-305481 A | 11/2000 |
| JP | 2001-305650 A | 11/2001 |
| JP | 2003-269915 A | 9/2003 |

* cited by examiner

Primary Examiner—Melissa Jan Koval
(74) Attorney, Agent, or Firm—Sughrue Mion, PLLC (57) ABSTRACT

The projection display device stores, in a frame memory, a shot image of a test pattern for cases where the obstacle is not represented in the region of the projection; compares, at a comparison unit, a shot image of the test pattern for the case where the obstacle is represented in the region of the projection, with the stored shot image of the test pattern in order to detect an obstacle present in the region of the projection; generates, at an image-mask enlargement-processing unit, an image mask section having a region larger than the region of the detected obstacle; and effects, at a luminance control unit, a control to reduce the luminance in the image mask section.

13 Claims, 6 Drawing Sheets

PROJECTION DISPLAY DEVICE

BACKGROUND OF THE INVENTION

1. Field of the Invention

The present invention relates to a projection display device and, in particular, to a projection display device capable of detecting an obstacle (a person) when the obstacle enters the region of a light beam projected from a projection display device, and also capable of producing an image mask that has a larger region than the region of the detected obstacle in order to reduce luminance and thereby ensure safety of the human body (an eye).

2. Description of the Related Art

Conventionally, projection display devices of this type allow the user to recognize the content of video pictures that have been projected onto a screen by getting the picture into his or her sights. Accordingly, the projection system for projecting a light beam onto the screen necessarily involves having a space between the projection display device and the screen that permits passage of the projection-light beam. Consequently, when an obstacle, specifically a person, accidentally enters the space within the region of the projected video picture, the projection light can cause discomfort (to the person) and, in addition, can damage the eye. Such injuries have increased in line with recent technical trend towards higher luminance in projected video pictures.

Thus, in order to solve the above problem, a projection display device has been developed in which a human-body sensor unit that has a pyroelectric sensor and a laser scanner unit that has a primary and secondary scanning beam sensor are provided, whereby the entrance of the obstacle into the path of a projection-light beam is detected; and when the obstacle is detected, the scanner control unit operates to either halt the output of the laser oscillator or to mechanically shutoff the emission of scanning light, thereby ensuring safety of the human body (cf. for example, JP 2000-194302).

Other types of projection display devices have also been developed that are intended to suppress discomfort when a projection light is directly incident on human vision. One example of such a device comprises an electro-optic device that emits light modulated by image signals, an image processing unit that supplies the image signals to the electro-optic device and a luminous flux controller that controls the luminous flux of the projection light provided from the electro-optic device. The luminous flux controller has a detection unit adapted to detect a person entering the path of the projected light beam and a suppression control unit adapted to suppress the supplied luminous flux of the projected light beam when the detection unit detects the person's entrance. In this way, it is able to suppress discomfort when the projection light is directly incident on human vision (cf. for example, JP 2001-305650).

In the technique described in JP 2000-194302 above, safety of the human body is ensured by detecting the entrance of the obstacle into the projection-light path with a pyroelectric sensor provided in the human-body sensor unit, and when the obstacle is detected, either halting the output of the laser oscillator or mechanically shutting off the emission of scanning light by means of the scanner control unit. However, since the human-body sensor is intended for detecting the obstacle before the obstacle makes contact with the region of the projected video picture and preventively halting the output of the laser oscillator or shutting down the projection of the scanning light, when the obstacle is located remote from the projection display device, such as when the person stands up near the central location on the screen side, the position of the obstacle can in some cases be beyond the area where the human-body sensor can detect the obstacle. This gives rise to a problem whereby there are situations in which projection of the light onto the eye cannot be avoided.

In the technique described in JP 2001-305650 above, the projection display device is adapted to obviate the discomfort when the emitted light beam happens to come into direct contact with a human vision, by suppressing the luminous flux of the projection-light beam via the suppression control unit when the detection unit, which is capable of detecting the entrance of a human body into the path of the projected video picture, detects such entrance. The detection unit, however, is incapable of detecting the obstacle (the human body) when it is positioned close to the screen and remote from the projection display device, because the detection unit can only detect the human body when it enters an area within a predetermined range. This gives rise to the problem that there are situations where the projection light on the eye cannot be avoided and safety for a human body cannot be ensured.

SUMMARY OF THE INVENTION

It is an object of the present invention to provide a projection display device capable of ensuring safety of the human body (an eye) in order to solve the above problem by storing a shot image of a test pattern for cases where the obstacle is not represented (pictured) in the region of the projection; comparing a shot image of the test pattern for the case where the obstacle is represented in the region of the projection with the stored shot image of the test pattern in order to detect an obstacle present in the region of the projection; generating an image mask section having a region larger than the region of the detected obstacle; and reducing the luminance in the image mask section.

A projection display device according to the present invention comprises: an image processing means for processing input image data to generate a display image; a projection lens for projecting the display image processed by the image processing means on to a screen to make an enlarged presentation of a video picture; a test-pattern projection means for projecting a test pattern on to the screen through the projection lens; an imaging means provided with an imaging element for shooting the projected video picture and a photograph lens; a shot-image analysis means for analyzing a shot image generated by the imaging means and also for detecting an obstacle pictured within a region of the projected video picture; an image mask generation means for generating an image mask corresponding to the detected obstacle; and a luminance control means for controlling luminance that corresponds to the image mask; wherein the image mask generation means is provided with an image-mask enlargement-processing means for generating an image mask section having a larger region than the image region corresponding to the detected obstacle.

The shot-image analysis means comprises: a memory means for storing a shot image of the test pattern for cases where the obstacle is not represented in the region of the projected video picture; a means for comparing the shot image of the test pattern, for cases where the obstacle is pictured in the region of the projected video picture, with the shot image of the test pattern that is stored in the memory means; an obstacle detection means for detecting the obstacle based on the comparison result; and a switching means for transferring a received shot image of a test pattern to the memory means through a switching operation, the received shot image being a shot image of the test pattern, for cases where the obstacle is not pictured in the region of the projected video picture, and being received from the imaging means.

The luminance control means can have a means for reducing luminance.

The image-mask enlargement-processing means can have a means for determining the image mask section based on at least one specification including the size of the screen, the movement speed of the obstacle, the horizontal resolution, and the time required after the detection of the obstacle until the control of luminance is implemented by the luminance control means.

The image-mask enlargement-processing means can have a means for enlarging the image mask section in the vertical and/or horizontal direction.

The test pattern can include a pattern in a horizontal straight line.

The test pattern can include a straight line positioned in a direction that is not parallel to the straight line connecting the projection lens with the imaging means.

The test pattern can be pictured through an infrared ray.

The obstacle detection means can have a means for detecting the linearity of the test pattern that appears in a shot image and further for detecting a non-linear portion as the obstacle.

The obstacle detection means can have a means for seeking the difference between the shot image of the test pattern stored in the memory means and the shot image of the test pattern for cases where the obstacle is pictured in the region of a projected video picture, and a means for binarizing the sought difference.

Thus, the projection display device, according to the present invention, offers the advantage of ensuring the safety of the human body (an eye) during movement even when a person moves within the region of projection, by storing in the memory means a shot image of a test pattern for cases where the obstacle is not represented (pictured) in the region of the projection; comparing a shot image of the test pattern for cases where the obstacle is represented in the region of the projection with the shot image of a test pattern stored in the memory in order to detect an obstacle residing in the region of the projection; generating an image mask section having a region larger than the region of the detected obstacle; and reducing the luminance in the image mask section.

The above and other objects, features, and advantages of the present invention will become apparent from the following description with reference to the accompanying drawings, which illustrate examples of the present invention.

BRIEF DESCRIPTION OF THE INVENTION

DETAILED DESCRIPTION OF THE PREFERRED EMBODIMENT

Figure 1:
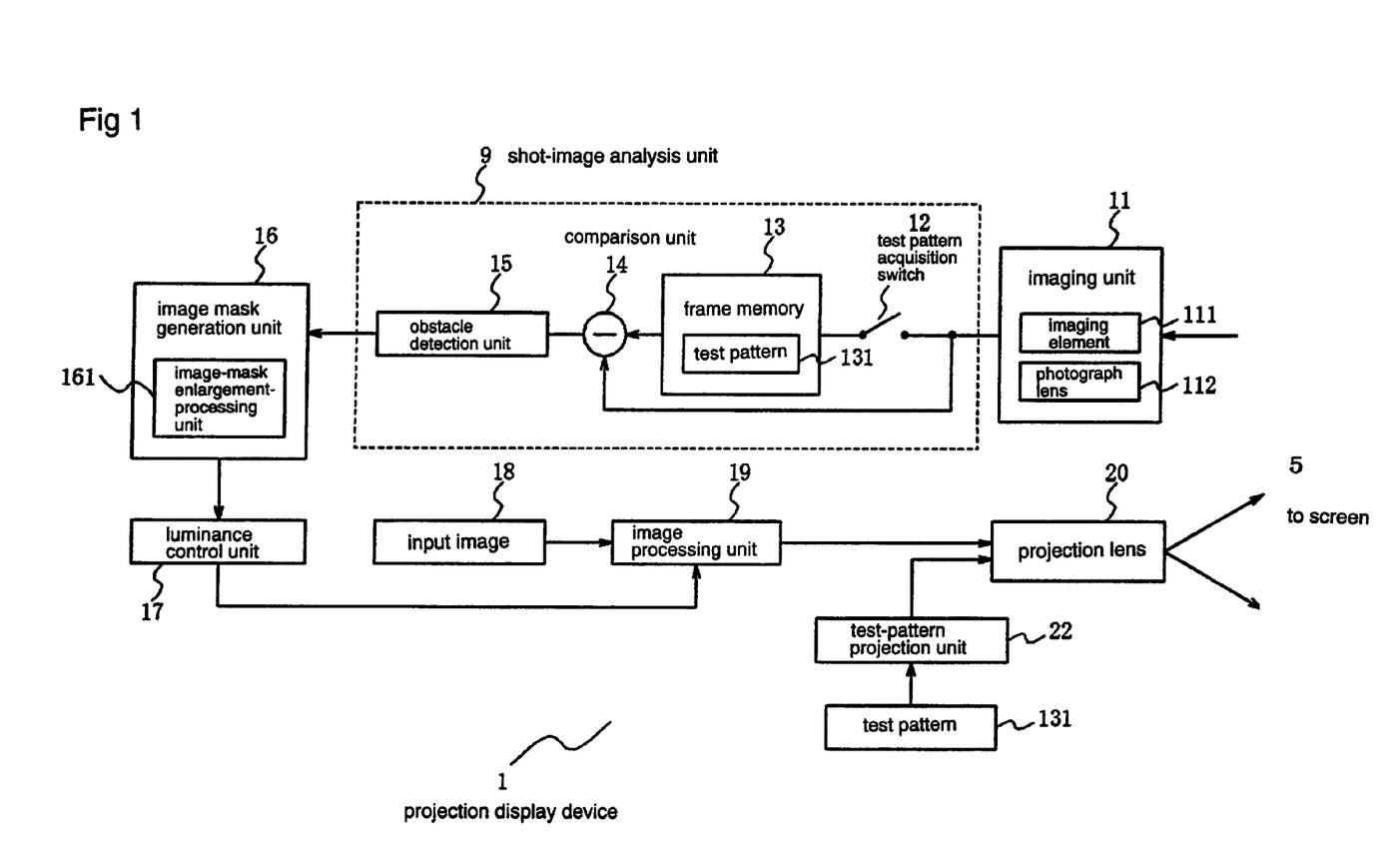
FIG. 1 is a block diagram illustrating the schematic construction of the embodiment of the projection display device according to the present invention.

FIG. 1 is a block diagram illustrating the schematic construction of the first embodiment of the projection display device according to the present invention.

Referring to FIG. 1, projection display device 1 comprises image processing unit 19 that executes image-display processing of the data of input image 18; projection lens 20 adapted to projection of a display image processed by image processing unit 19 onto screen 5 to provide an enlarged presentation of the projected display image (a video picture); test-pattern projection unit 22 that projects test pattern 131 onto screen 5 through projection lens 20; imaging unit 11 provided with imaging element 111 that shoots the projected video picture and also with photograph lens 112; shot-image analysis unit 9 that analyses shot images provided from imaging unit 11 and detects obstacle 7 represented within the region of the video picture; image mask generation unit 16 that generates an image mask corresponding to detected obstacle 7; and luminance control unit 17 that controls luminance corresponding to the image mask; wherein image mask generation unit 16 includes image-mask enlargement-processing unit 161 that generates image mask section 31 having a larger region than the region of detected obstacle 7.

Shot-image analysis unit 9 comprises frame memory 13 that stores a shot image of test pattern 131 for cases where an obstacle is not present within the region of the projected video picture; comparison unit 14 that compares a shot image of test pattern 131 for the case where an obstacle is present in the region of the projected video picture with the shot image of test pattern 131 stored in frame memory 13; obstacle detection unit 15 that detects obstacle 7 based on the comparison result; and test pattern acquisition switch 12 that, through a switching operation, permits transferring the shot image of test pattern 131 shot by imaging unit 11 to frame memory 13 for cases where obstacle 7 is not present in the region of the projected video picture, and shuts off the shot image of test pattern 131, for cases where obstacle 7 is present in the region of the projected video picture, from being transferred to frame memory 13.

Next, the operation of projection display device 1, constructed as described above, is explained with reference to the drawings.

Figure 2A:
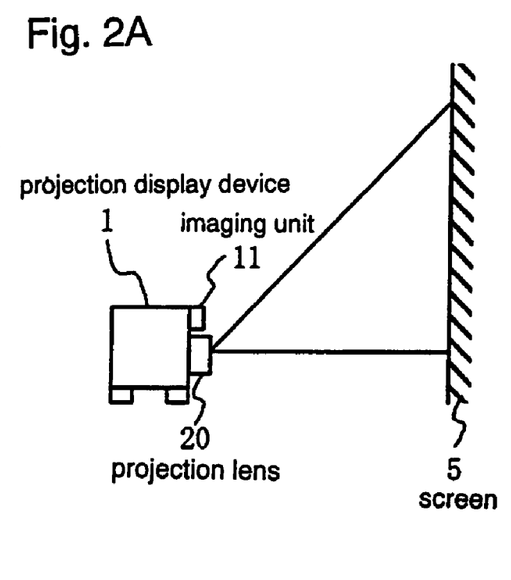
FIG. 2A is a diagram representing an example of using the projection display device when no obstacle is present between the screen and projection display device.
Figure 2B:
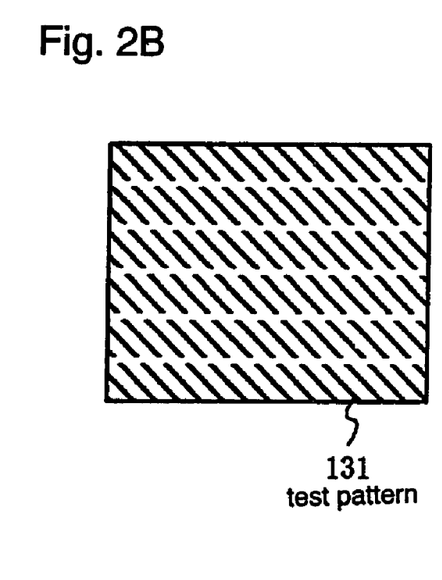
FIG. 2B is a diagram showing a test pattern.

FIG. 2A illustrates an example of using projection display device 1 for cases where there is no obstacle 7 between projection display device 1 and screen 5; FIG. 2B illustrates test pattern 131; and FIG. 2C illustrates shot image 61 shot by imaging unit 11.

Figure 3A:
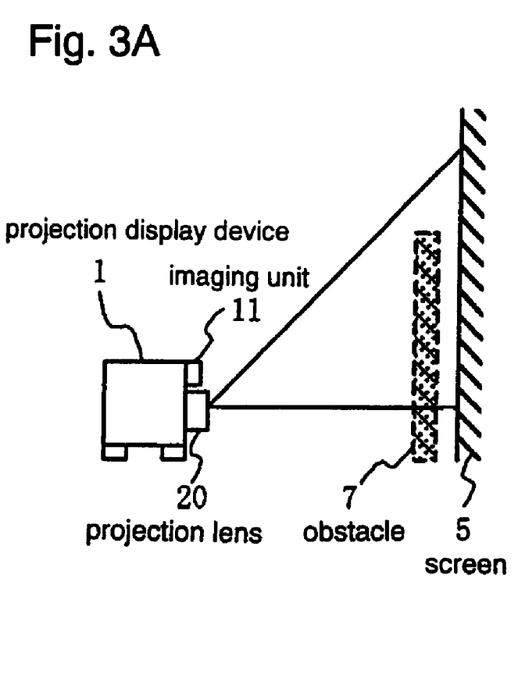
FIG. 3A is a diagram representing an example of using the projection display device when an obstacle is present between the screen and projection display device.
Figure 3B:
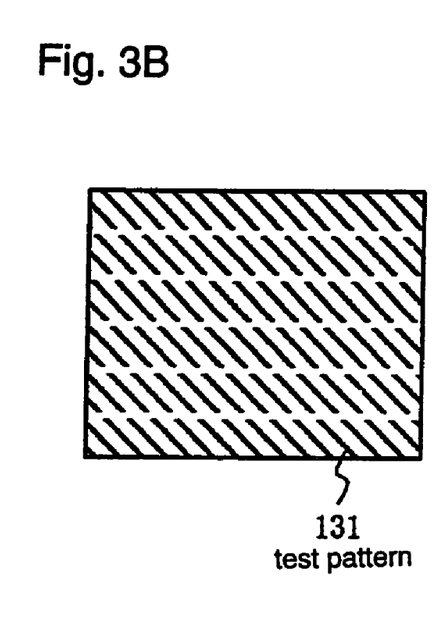
FIG. 3B is a diagram showing a test pattern.

FIG. 3A illustrates an example of using projection display device 1 for cases where there is obstacle 7 between projection display device 1 and screen 5; FIG. 3B illustrates test pattern 131; and FIG. 3C illustrates shot image 62 shot by imaging unit 11.

Figure 2C:
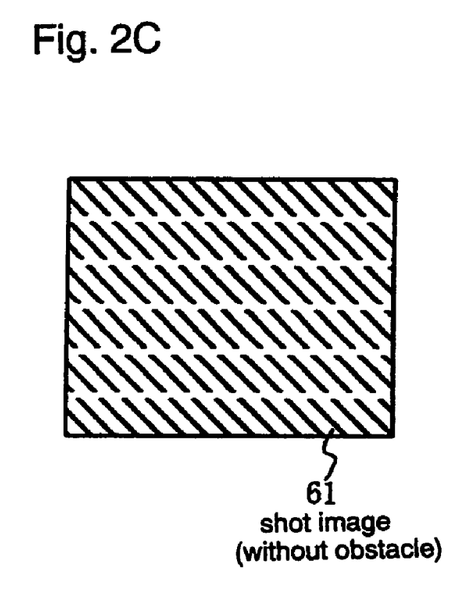
FIG. 2C is a diagram illustrating a shot image shot by the imaging unit.

Referring first to FIG. 2A through 2C, test pattern 131 has a straight horizontal pattern and is depicted by an infrared beam, the pattern positioned in the direction perpendicular to the straight line that connects projection lens 20 and imaging unit 11. In this case, the video picture, when shot by imaging element 111, has the shape of a simple straight line as shot image 61 shown in FIG. 2C.

Figure 3C:
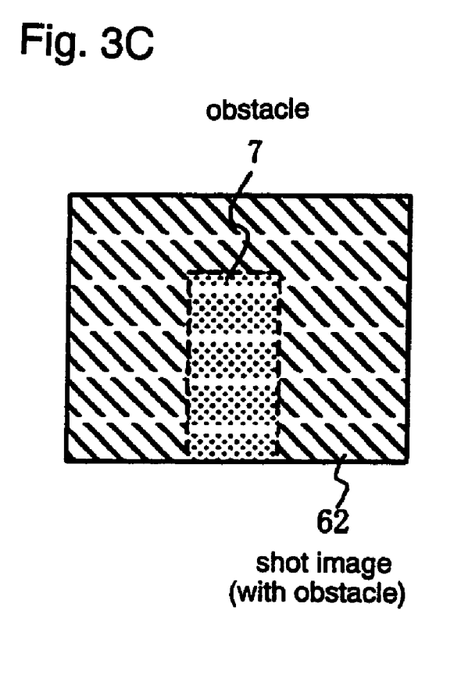
FIG. 3C is a diagram illustrating a shot image shot by the imaging unit.

When obstacle 7 exists between projection display device 1 and screen 5 as shown in FIG. 3A, however, the image shot by imaging element 111 has the pattern of shot image 62 as shown in FIG. 3C, straight lines corresponding to the location of obstacle 7 that shift from the straight lines corresponding to the picture of the test pattern projected onto screen 5. This shift is a phenomenon that arises from the arrangement of projection lens 20 which shifted from the location of imaging unit 11.

Accordingly, it is feasible to detect the location of obstacle 7 disposed between projection display device 1 and screen 5 by detecting the broken locations of the straight lines in shot image 62.

Figure 4:
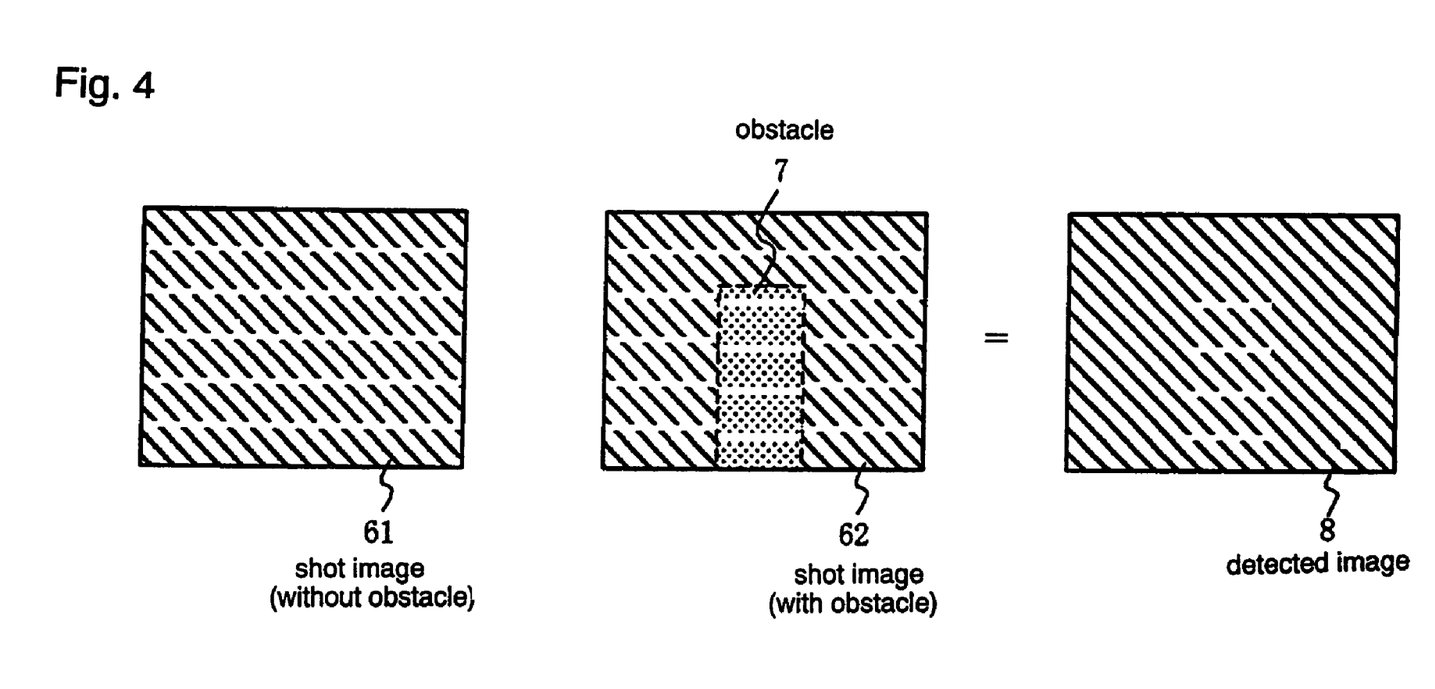
FIG. 4 is a diagram to illustrate the method for detecting the position of an obstacle.

FIG. 4 represents a diagram to illustrate the method for detecting the position of obstacle 7.

Referring to FIG. 4, comparison unit 14 finds a difference between the position of shot image 61 of test pattern 131 (cf. FIG. 2C), for cases where obstacle 7 is not represented (pictured) in the region of the projected video picture (the data of shot image 61 being stored in frame memory 13) and the position of shot image 62 of test pattern 131 (cf. FIG. 3C), for cases where obstacle 7 is represented in the region of the projected video picture; and obstacle detection unit 15 binarizes the found difference and calculates detected image 8.

Specifically, obstacle detection unit 15 subtracts the luminance of shot image 62 from the luminance of shot image 61 for each pixel, and if the subtraction result is a minus value, then the subtraction result is put as zero. The image obtained as a result of the calculation is represented in a binarized representation of black and white, thereby yielding detected image 8.

After the generation of detected image 8, image mask generation unit 16 produces image mask 30 corresponding to the detected image of obstacle 7. Image-mask enlargement-processing unit 161 produces an image mask section 31 having a region lager than the region of detected image 8 of obstacle 7. Luminance control unit 17 controls and reduces the luminance in image mask section 31.

In the above FIG. 2 through FIG. 4, while only 5 lines are depicted per one image plane, for the sake of convenience, in actuality, several tens of horizontal lines can be displayed per image plane, whereby an error arising from the gaps between the horizontal lines can be suppressed to such a level that no practical problems are caused.

Figure 5:
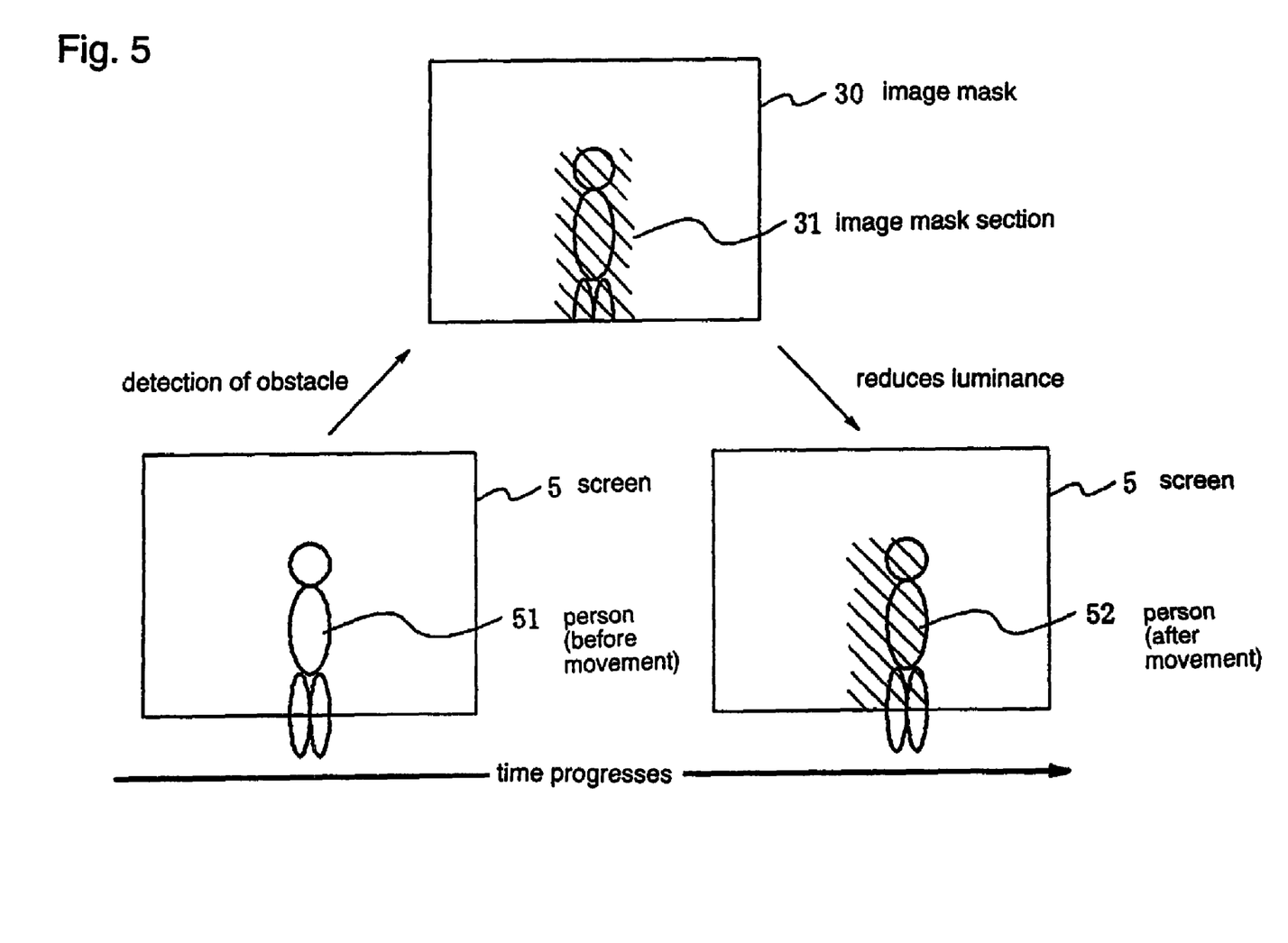
FIG. 5 is a diagram to illustrate the operation when a person enters the area between the projection display device and screen and the person moves.

Specific explanation is next presented with reference to FIG. 5 regarding a sequence of operations from the above-described detection of obstacle 7 to the reduction of luminance in image mask section 31.

FIG. 5 is a diagram to illustrate the operations of the projection display device when a person enters the area between the projection display device and screen 5 and moves within this area.

Referring to FIG. 5, when a person moves right, as time progresses in the drawing, obstacle detection unit 15 effects the detection of obstacle at the location of the person (before movement) 51, deeming it as obstacle 7 and makes image mask 30 based on the detection information. In making image mask 30, image-mask enlargement-processing unit 161 magnifies the dimension of detected image 8 of the obstacle included in the detection information in both right and left directions to form image mask 30 inclusive of image mask section 31.

The person 52 can be protected from being irradiated by high luminance by reducing the luminance of the video picture to be projected to the region of this image mask section 31 even when the person moves to the position of the person 52 (after movement), because person 52 is present in the region where the luminance of the projected video picture falls, so that safety for a human body (an eye) in motion is ensured.

Figure 6:
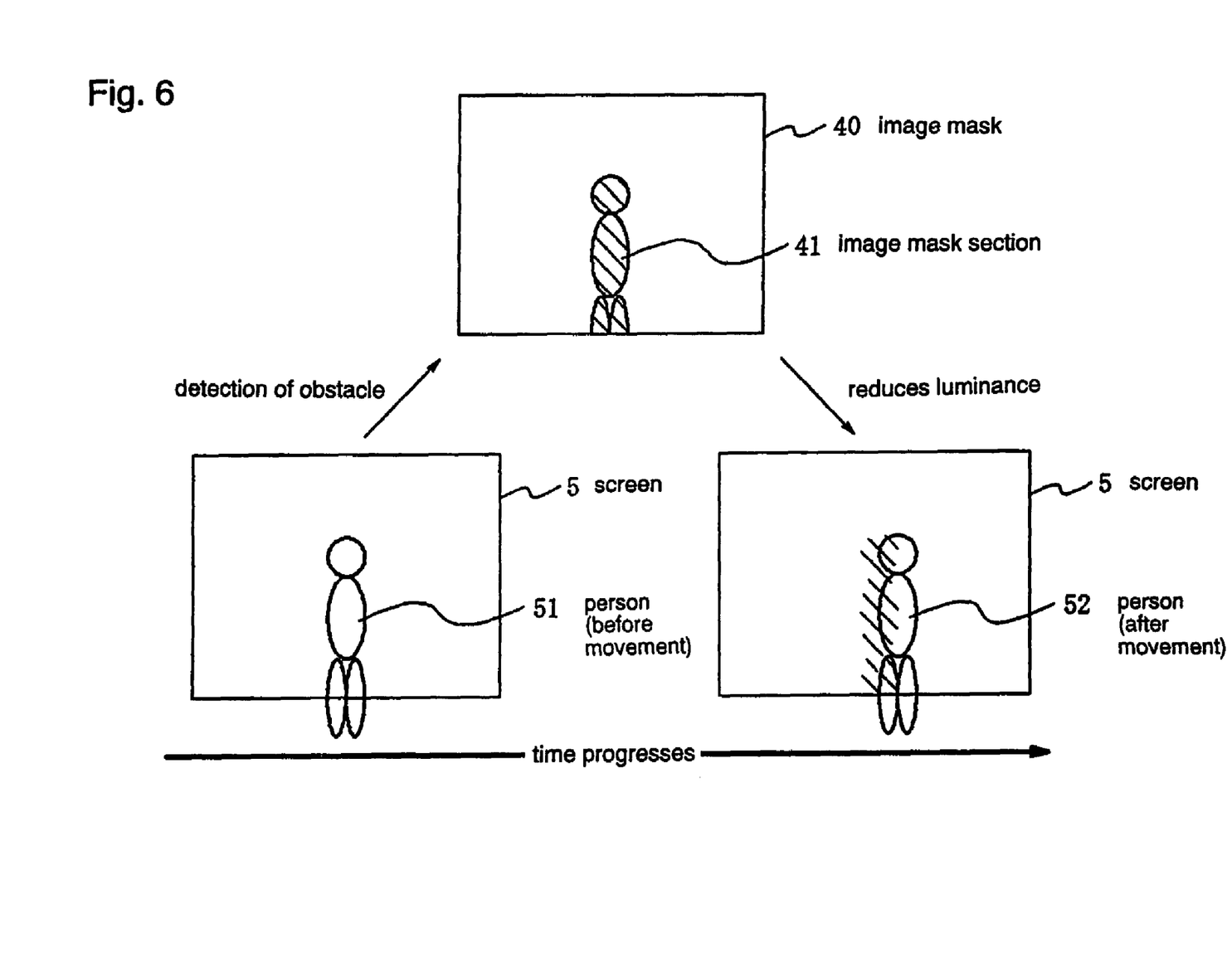
FIG. 6 is a diagram to illustrate the operation in cases where the image mask section is generated without enlarging the detected image of the obstacle.

For reference, explanation is presented with reference to FIG. 6 regarding cases where image mask 40, inclusive of image mask section 41, is formed without enlarging the dimension of detected image 8 of the obstacle included in the detection information in both right and left directions.

When a person moves right in FIG. 6 as time progresses, the detection of the obstacle occurs at the position before movement of person 51, and image mask 40 is generated based on the detection information. In generating image mask 40 in this case, image mask 40, which has image mask section 41, is formed based upon the dimensions described in the information for detected image 8, and the luminance of the video picture which is to be projected to the region which corresponds to the region of image mask section 41, is reduced. However, after the person has moved to the position of person 52, he or she is irradiated in that high luminance region where the projected video picture's luminance has not been reduced, the amount of irradiation is based upon the person's movement, and the result is an inability to ensure safety (of the person).

In addition, while image mask section 31 is enlarged in the horizontal direction in the embodiment shown in FIG. 5, it should be pointed out that ensuring safety is feasible by enlarging image mask section 31 in the vertical direction and by anticipating if human actions that entail movements in the vertical direction such as romping and jumping. The explanation is herein omitted.

Explanation is here presented regarding an example of the method of enlarging image mask section 31 that is implemented by image-mask enlargement-processing unit 161.

It is assumed that screen 5 is of a 100 inch standard (about 2 m in a horizontal length) and the specifications of the projection display device are 1024 dots of horizontal resolution and 3 m/sec (about 11 km/hour) moving velocity (person), presuming that the time required from the detection of an obstacle (person 51) to the reflection of the luminance reduction on the projected video picture that is effected by luminance control unit 17 is $\frac{3}{60}$ sec. Then, the displaced distance of a person in the horizontal direction will correspond to 3 (m/s)×$\frac{3}{60}$(s)×1024 (dot)/2(m)=77 (dot).

Thus, enlarging image mask section 31 by 80 dots, which is an increase above 77 dots, in each of the right and left directions makes it possible to sufficiently reduce the luminance of the pixels that cover the range of movements of the person, thereby preventing irradiation of the person by high luminance, whereby the safety of a person in motion is ensured even when he is moving in the region of the projected video picture.

For reference, the number of dots to be enlarged, can be fixed at a sufficient value to ensure the safety of the person.

While preferred embodiments of the present invention have been described using specific terms, such description is for illustrative purposes only, and it is to be understood that changes and variations may be made without departing from the spirit or scope of the following claims.

What is claimed is:

1. A projection display device comprising:
   an image processing means for processing input image data to generate a display image;
   a projection lens for projecting the display image processed by said image processing means onto a screen to make an enlarged presentation of a video picture;
   a test-pattern projection means for projecting a test pattern on said screen through said projection lens;
   an imaging means provided with an imaging element for shooting the projected video picture and a photograph lens;
   a shot-image analysis means for analyzing a shot image generated by said imaging means and also for detecting an obstacle within a region of said projected video picture;
   an image mask generation means for generating an image mask that corresponds to the detected obstacle; and
   a luminance control means for controlling luminance corresponding to said image mask; wherein said image mask generation means is provided with an image-mask enlargement-processing means for generating an image mask section that has a larger region than the region corresponding to the detected obstacle.

2. A projection display device according to claim 1, wherein said shot-image analysis means comprising:
   a memory means for storing a shot image of said test pattern for a case where said obstacle is not represented in the region of the projected video picture;
   a means for comparing the shot image of said test pattern, for cases where said obstacle is pictured in the region of the projected video picture, with the shot image of said test pattern that is stored in said memory means;
   an obstacle detection means for detecting said obstacle based on a comparison result; and
   a switching means for transferring a received shot image of a test pattern to said memory means through a switching operation, said received shot image being a shot image of said test pattern, for cases where said obstacle does not exist in the region of the projected video picture, and being received from said imaging means.

3. A projection display device according to claim 1, wherein said luminance control means has a means for reducing luminance.

4. A projection display device according to claim 1, wherein said image-mask enlargement-processing means has a means for determining said image mask section based on at least one specification including a size of the screen, a movement speed of the obstacle, a horizontal resolution, and a time required after the detection of said obstacle until the control of luminance is implemented by said luminance control means.

5. A projection display device according to claim 1, wherein said image-mask enlargement-processing means has a means for enlarging said image mask section in a vertical and/or horizontal direction.

6. A projection display device according to claim 1, wherein said test pattern includes a pattern in a horizontal straight line.

7. A projection display device according to claim 1, wherein said test pattern includes a straight line positioned in a direction that is not parallel to the straight line connecting said projection lens with said imaging means.

8. A projection display device according to claim 1, wherein said test pattern is pictured through an infrared ray.

9. A projection display device according to claim 6, wherein said test pattern is pictured through an infrared ray.

10. A projection display device according to claim 7, wherein said test pattern is pictured through an infrared ray.

11. A projection display device according to claim 2, wherein said obstacle detection means has a means for detecting a linearity of said test pattern which appears in a shot image and further for detecting a non-linear portion as said obstacle.

12. A projection display device according to claim 2, wherein said obstacle detection means has a means for seeking a difference between the shot image of said test pattern stored in said memory means and the shot image of said test pattern for cases where said obstacle is pictured in the region of a projected video picture, and
   a means for binarizing the sought difference.

13. The projection display device according to claim 1, wherein said test pattern projection means projects a test pattern using visible light.

* * * * *